United States Patent [19]

Ōdaira

[11] Patent Number: 4,711,787
[45] Date of Patent: Dec. 8, 1987

[54] LIVESTOCK FEED AND MANUFACTURING METHOD THEREOF

[75] Inventor: Keikichi Ōdaira, Tokyo, Japan

[73] Assignee: Yojigen Agricultural Corporation, Tokyo, Japan

[21] Appl. No.: 836,220

[22] Filed: Feb. 28, 1986

Related U.S. Application Data

[63] Continuation of Ser. No. 632,529, Jul. 19, 1984, abandoned.

[30] Foreign Application Priority Data

Aug. 4, 1983 [JP] Japan ................................ 58-142827

[51] Int. Cl.$^4$ .............................................. A23K 1/00
[52] U.S. Cl. ......................................... 426/31; 426/46; 426/53; 426/61; 426/521
[58] Field of Search ..................... 426/46, 623, 52, 53, 426/31, 630, 656, 807, 61, 521, 632, 529

[56] References Cited

U.S. PATENT DOCUMENTS

| | | | |
|---|---|---|---|
| 923,070 | 5/1909 | Okazaki ................................. | 426/31 |
| 4,379,844 | 4/1983 | Young .................................... | 426/53 |
| 4,447,530 | 5/1984 | Young .................................... | 426/53 |
| 4,457,945 | 7/1984 | Imamura et al. ...................... | 426/53 |

FOREIGN PATENT DOCUMENTS

| | | | |
|---|---|---|---|
| 45-21609 | 7/1970 | Japan ..................................... | 426/53 |
| 49-27790 | 7/1974 | Japan ..................................... | 426/53 |
| 53-98280 | 8/1978 | Japan ..................................... | 426/53 |
| 57-206361 | 12/1982 | Japan ..................................... | 426/52 |
| 1510012 | 5/1978 | United Kingdom .................. | 426/53 |
| 2074558 | 11/1981 | United Kingdom .................. | 426/53 |

OTHER PUBLICATIONS

Chemical Dictionary, p. 18.
Chikusan Daijiten (Stockbreeding Dictionary), p. 634.

Primary Examiner—R. B. Penland
Attorney, Agent, or Firm—Frishauf, Holtz, Goodman & Woodward

[57] ABSTRACT

A method of manufacturing a livestock feed from okara or refuse produced in the manufacturing of soybean curd or soybean milk. In this method, okara is mixed with a lignin-bearing substance to form a medium for cultivating then white-rotting fungi. When the white-rotting fungi is cultivated in this medium, the composition of okara can be converted into a satisfactory livestock feed. A livestock feed prepared from okara, which can be stored without being denatured for a long period of time, is also disclosed.

11 Claims, No Drawings

LIVESTOCK FEED AND MANUFACTURING METHOD THEREOF

This application is a contnuation, of application Ser. No. 632,529, filed July 19, 1984, now abandoned.

BACKGROUND OF THE INVENTION (1) Field of the Invention

This invention relates to livestock feed mainly consisting of refuse produced in the preparation of soybean curd and soybean milk.

(2) Description of the Prior Art

The global foodstuff conditions at present and in future involve serious latent problems. Namely, recent abnormal global atmospheric phenomena and the conversion of the green tracts of land into deserts cast a dark outlook on the preservation of human foodstuff. This gloomy tendency is expected to continue in the future. On the other hand, the diet of people is some quarters of the world is abundant. As a result, there is an increasing demand for high quality delicious food and a tendency toward an enormous consumption of meat. At present, however, difficulties are arising in the procurement of feed for livestock utilized as meat due to the above-mentioned recent global abnormal atmospheric condition.

Therefore, various attempts are being made to cope with the shortage of livestock feed under the circumstances mentioned above.

For instance, it has hitherto been tried to apply the refuse derived from soybean curd and soybean milk production as a useful feed for livestock, for example, pigs. The soybean curd and soybean milk, foodstuff peculiar to Japan, are now widely disseminated over the world. However, the process of effectively utilizing the above-mentioned refuse, hereafter referred to as "okara", is still regarded as unsatisfactory. Therefore, the most of the okara is simply wasted today. Consequently, the object of this invention is to save the precious cereal resources by utilizing "okara" as livestock feed.

Hitherto, however, okara has been applied as livestock feed in the form mixed with the other kinds of livestock feed. However, feeding of okara intack to livestock has been accompanied with the undermentioned drawbacks:

(1) okara is decomposed in a day or two, presenting difficulties in preservation and transportation;

(2) feeding of a large amount of okara leads to a decline in the fleshy portion of livestock, usable as meat, though increasing the fatty content. Further, the fat tends to turn yellow, considerably depreciating the commercial value of the meat; and (3) Constantly feeding a great deal of okara causes the livestock to suffer from diseases such as a gastric ulcers.

The above-listed drawbacks of okara as livestock feed are detrimental. Therefore, the utilization of okara as livestock feed has its importance questioned and is recently beginning to be avoided.

On the other hand, the soybean curd and soybean milk are being consumed in increasingly higher quantities. Moreover, the manufacturing of soybean products is being shifted from the house hold scale to the large industrial scale, thereby resulting in the discharge of tremendous quantities of okara. As mentioned above, however, a decline in the utilization of okara as livestock feed causes this soybean refuse to be simply wasted.

SUMMARY OF THE INVENTION

The present inventors have conducted studies over many years for the solution to problems related to the above-mentioned livestock feed. The inventors have studied the procurement of highly nutritious livestock feed from okara with substantial success and accomplished the present invention. The object of the invention is to provide a method of manufacturing a livestock feed which can eliminate the drawbacks of the conventional okara when used as livestock feed.

The above-mentioned object is attained by the method of this invention which comprises the steps of:

mixing a lignin-bearing substance with okara to such extent that the mixture contains 10 to 20% of lignin (as measured on the dry basis);

preparing a medium for white-rotting fungi by sterilizing the mixture; and cultivating in said medium edible fungi of said white-rotting fungi having the function of forming mycorrhiza, thereby converting the components of okara which are unsuitable as livestock feed into a valuable substance for livestock feed.

DETAILED DESCRIPTION OF THE PREFERRED EMBODIMENT

Okara, used as a raw material in this invention, is the refuse derived from a manufacturing of soybean curd and soybean milk. No limitation is imposed on the structural pattern of said okara. Generally, okara is commercially supplied in the form containing 80 to 84% of water. The present invention allows for the use of this type of okara. The chaffs of rice and wheat, that is, husks or vegetable fibers can be mixed as a lignin-bearing substance with okara. The husks or vegetable fibers generally contain 20 to 23% of lignin and 9 to 10% of water. Such a lignin-bearing substance is crushed and mixed with the okara, thereby preparing a raw mixture containing 10 to 20% of lignin. If desired, a small amount of a vitamin A-bearing substance such as fish meal is added to said raw mixture.

A description may now be made of an instance of preparing the raw mixture. It is preferred to mix 100 kg of okara containing 80 to 83% of water with 26 kg of crushed chaff containing 20 to 23% of lignin and 9 to 10% of water and 3 kg of fish meal containing 9 to 10% of water.

The raw mixture thus prepared is sterilized by the ordinary process to eliminate the contained fungi and used as a medium for white-rotting fungi. In this case, sterilization, for instance, at 120° C. for one hour substantially destroys saprophyte.

The white-rotting fungi, cultured in the above-mentioned medium, are known as microbes which are very important for the decomposition of substances such as lignin, which is difficult for bacteria in the soil to decompose. This invention is intended to convert the raw mixture into a very valuable concentrated livestock feed by the action of microbes. Therefore, the white-rotting fungi cultured in the medium should have the function of creating mycorrhiza and being of an edible type. Agaric (Pleurotus ostreatus), Lentinus edoes (Cortinellus shiitake) and Lyophyllum aggregatum are most preferred as the above-mentioned white-rotting fungi.

It is preferred to cultivate the above-mentioned types of white-rotting fungi at a humidity of 60 to 75% and temperature of 22° C. to 26° C. When the mushroom fungi are continuously cultivatured for 25 to 30 days under the above-mentioned conditions, the medium is noticeably fertilized to produce an important nutritional value as livestock feed. When the cultivation medium is kept at a humidity of 80 to 95% and a temperature of 12° C. to 18° C. to promote the growth of the mushroom fungi after completing the cultivation of the aforesaid mushroom fungi, the cultivation medium from which the mushroom fungi have been gathered can still be applicable as a livestock medium having substantially the same efficacy as the livestock feed embodying this invention. Therefore, the present invention offers the advantage of producing not only a concentrated livestock feed but also realizing the growth of mushroom fungi.

The present invention further has the undermentioned merits:

(1) Ordinarily, a mixture applied as a medium for cultivating mushroom fungi must be sprinkled with water before sterilization, depending on the kinds of the raw materials used. This is for the purpose of allowing the mixed mass to have a water content of 60 to 70%. If otherwise, the mixed mass already contains too much water, it is necessary to take the step of removing the excess water in order to reduce the water content to the prescribed 60 to 70%. However, the livestock feed-manufacturing method of this invention dispenses with the above-mentioned steps. The okara procured from the soybean curd industry uniformly contains water of 80 to 84% as previously mentioned. If, therefore, the cereal husks and fish meal containing 9 to 10% of water are mixed with the okara in the afore-mentioned ratio, then the mixed mass will hold water of 65±3%, a water content adapted for the production of a mushroom fungi-cultivating medium. Therefore, the present invention eliminates the step of increasing or decreasing the water constent of the mixed raw mass for the livestock feed, and also offers a mushroom-cultivating medium having an optimum composition.

(2) Okara alone fails to be used as a medium for the growth of mushroom fungi. However, the above-mentioned steps of the present invention enables the okara to be applied as an excellent medium for producing mushroom fungi. In this connection, a description may be made of the merit of the present invention. Namely, as compared with sawdust and other materials ordinarily used as a medium for the cultivation of mushrooms, the method of the present invention ensures a mushroom yield 50 to 60% larger, on the average.

This invention will be more apparent from the following example.

EXAMPLE 100 kg okara containing 80 to 83% of water, 26 kg of crushed cereal husks containing 20 to 23% of lignin and 9 to 10% of water, and 3 kg of fish meal containing 9 to 10% of water were mixed and agitated to provide a raw mixture. The mixture was sterilized at 120° C. for one hour to provide a mixed medium for the growth of mushroom fungi. Mushroom fungi (agaric: Pleurotus ostreatus) were cultivated in the medium at a temperature of 24° C. for 20 to 25 days. Analyses were made of the various components of the raw mixture before the cultivation of the above-mentioned mushroom fungi and the cultivation medium used as a livestock feed after the cultivation of said mushroom. The results are presented in Table below.

TABLE

| Percentage content in 100 g of the medium (dry basis) | Components of Mushroom-Cultivating Medium | | | | | |
|---|---|---|---|---|---|---|
| | Protein (%) | Coarse fat (%) | Soluble nitrogen-free substance (%) | Coarse fiber (%) | Coarse ash (%) | Lignin (%) |
| Raw cultivation medium | 13.7 | 6.5 | 33.1 | 33.8 | 12.9 | 14.4 |
| Cultivation medium used as a livestock feed | 15.1 | 1.0 | 42.5 | 29.9 | 11.5 | 8.9 |
| Change in content | +1.4 | −5.5 | +9.4 | −3.4 | −1.4 | −5.5 |

Referring to vitamins, vitamins B2, B3, B12, D2, L, etc., which were not observed in the raw cultivation mixture were amplified by the cultivation mixture used as a livestock feed after the cultivation of mushroom fungi. This shows that nutritious components and vitamins were more noticeably amplified in the mushroom-cultivating medium used as a livestock feed than in the raw mixture, namely that the medium after the cultivation of mushroom fungi assumed a great value as a livestock feed.

Experiments were made by feeding pigs, cattle and fowl with the above-mentioned mushroom-cultivation medium used as a livestock feed. The following results were proved.

(1) The livestock feed met the dietetic taste of pigs, cattle and fowl and increased their appetite.

(2) The gastic ulcer of pigs was prevented.

(3) The fat of pigs and cattle was prevented from turning yellow.

(4) The excrements of pigs, cattle and fowl were extremely deodorized.

(5) The subject mushroom-cultivating medium proved to be effective feed for all livestock The above-mentioned prominent merits are assumed to arise from the fact that in the mushroom-cultivating medium applied as livestock feed, free amino acids such as histidine, glycine, arginine, aspartic acid, etc., obtained as the metabolic products of mushroom fungi, are amplified, and also vitamin A is abundant due to the addition of fish meal.

When the livestock feed obtained by the method of this invention (containing 60 to 65% of water) was allowed to stand at room temperature while tightly sealed in a polyethylene bag, it was proved that said livestock feed was saved from the growth of molds and prevented from being decomposed for over one year and, therefore, has an excellent storage characteristic. This merit is assumed to arise from the fact that white edible decayed fungi are still living in the subject livestock feed. The fact can be regarded as a surprising characteristic of the livestock feed of this invention as compared with the single okara, which is easily subject to the occurrence of molds and decay when allowed to stand for only two days.

As previously mentioned, the okara is accompanied with various defects when applied intact as livestock feed, and recently has been regarded as refuse. The lignin-containing substances such as cereal husks are also simply wasted. However, this invention enables a very efficacious livestock feed to be manufactured from the mixture of said okara and cereal husks. Further, this invention offers a very noticeable advantage of enabling mushroom fungi to be grown with greater profit than has been possible in the past. Consequently, this invention bears a great importance as one of the effective measures for resolving foodstuff problems now confronting the world, particularly difficulties encountered in the production of livestock feed and the feeding of livestock.

As mentioned above, the livestock feed manufactured by the method of this invention can be stored over a long period while containing 60 to 65% of water, thereby eliminating the drying step and saving the required heating energy. If the subject livestock feed has to be transported for a long distance, it is possible to convert the product into the dry state, e.g. powders or pellets.

What is claimed is:

1. A method of manufacuturing a livestock feed which consists essentially of the steps of
    mixing okara with cereal husks to form a mixture containing from 10 to 20% by weight lignin as measured on the dry basis, and 60 to 70% water
    sterilizing the mixture to provide a medium for the growth of edible white-rotting fungi; and
    adding edible white-rotting fungi which have a substantial mycorrhiza-forming function selected from the group consisting of agaric (*Pleurotus ostreatus*), *Lentinus edoes* (*Cortinellus shiitake*) and *Lyopyllum aggregatum* to said mixture and cultivating said fungi to convert said mixture containing okara which is not useful as a livestock feed into a valuable liverstock feed.

2. The method of claim 1, wherein fish meal is admixed with said okara.

3. The method of claim 1, wherin said sterilization is carried out by heating.

4. The method of claim 1, wherein said okar contains 80-84% of water and said cereal husks contain 20-23% lignin and 9-10% water.

5. The method of lcaim 1, wherein said cultivation is carried out at a humidity of 60-75% and at a temperature of 22° C.-26° C.

6. The method of claim 5, wherein said okara contains 80-84% of water and said cereal husks contain 20-23% lignin and 9-10% water, wherein said sterilization is carried out by heating and wherein said fungi is selected from the group consisting of agaric (*Pleurotus ostreatus*), *Lentinus edoes* (*Cortinellus shitake*) and *Lyophyllum aggregatum*.

7. The method of claim 6, wherein fish meal containing 9-10% of water is admixed with said okara ceral husks.

8. The method of claim 6, wherein fish meal containing 9-10% of water is admixed with said okara and said cereal husks.

9. A method of manufacturing a livestock feed and of cultivating mushrooms which consists essentially of the steps of
    mixing okara with cereal husks to form a mixture containing from 10 to 20% by weight lignin as measured on the dry basis, and 60 to 70% water;
    sterilizing the mixture to provide a medium for the growth of edible white-rotting fungi;
    adding mushroom forming white-rotting fungi which have a substantial mycorrhiza-forming function selected from the group consisting of agaric (*Pleurotus ostreatus*), *Lentinus edoes* (*Cortinellus shiitake*) and *Lyophyllum aggregatum* to said mixture and cultivating said fungi on said medium to convert said okara containing medium into a livestock feed and to grow mushrooms on said medium; and
    separating said mushrooms from said livestock feed.

10. The method of claim 9, wherein said okara contains 80-84% of water and said ceral husks contain 20-23% lignin and 9-10% water.

11. The method of claim 10, wherein said cultivation is carried out at a humidity of 60-75% and at a temperature of 22° C.-26° C.

* * * * *